Patented Apr. 9, 1940

2,196,435

UNITED STATES PATENT OFFICE 2,196,435

PRINTING COMPOSITION

Maurice Belloc, Paris, France, assignor to Societe Nobel Francaise, Paris, France, a joint-stock company of France No Drawing. Application August 17, 1937, Serial No. 159,603. In France February 2, 1937

1 Claim. (Cl. 260—19)

The present invention refers to printing process for fabrics and the fabrics obtained by applying this process.

Printing on fabrics by means of aqueous solutions, or engraved blocks or screens, which permits producing the so-called "Lyonnaise" print, is known.

The use of colloidal solutions of cellulose esters or synthetic resins in organic solvents for printing is the subject of application, Serial No. 151,321 filed June 30, 1937.

The use of oil-soluble resins of phenol and its aliphatic substitution products is known in varnish making. The combination of such resins with resin or ester gum is likewise known.

The present invention constitutes an improvement on the above mentioned application Serial No. 151,321. An object of the present invention is the preparation of a dispersion of the cheap resins of the phenol-formaldehyde type which will be applicable to fabrics by the usual printing processes. Such a dispersion must approximate the physical properties of the aqueous solution of dextrines and gums which the processes and machinery employed are adapted to use. The rate of evaporation must be such that the dispersion will not dry on the rolls or printing surface and yet must be such that the drying chamber can continuously dry the printed fabric. The dispersion must likewise leave the printing surface readily and not tend to clog the same, that is, the surface tension of the solution must not be substantially greater than the previously used solutions.

Another object of the invention is to provide a combination of solvents, drying oils and resins to permit the use on conventional printing machines and in ordinary printing processes.

The inconveniences of printing processes using aqueous solutions or suspensions are well known. The colloidal dispersion of cellulose esters and synthetic resins has helped to overcome these inconveniences, but the price of fabrics printed by means of this process is rather high so that the said process can be used only with fairly expensive fabrics.

According to the invention, the printing composition is prepared from the following substances:

(1) Oil soluble phenolic resin. As is known, these phenolic resins are of two principal types: One type is prepared starting from ordinary phenols, cresols, xylenols, etc. and formaldehyde and contain besides, a natural resin, such as colophony, or a modified natural resin, like an ester gum (colophony more or less completely esterified by glycerine). The other type of resins of this kind are those prepared by starting from substituted phenols, such as, butyl, amyl, diisobutyl phenols, etc., and condensing them with formaldehyde, without the addition of natural resin. In principle any oil soluble phenol resin could serve the purpose in question on condition that the solution of the resin in the oil is effected by cooking and that the solvents which I claim in the remainder of the application are capable of dissolving the mixture of oil and resin. Very condensed resins are less suitable since such resins become less and less soluble in oxygenated solvents when their degree of polymerization increases. Resins prepared with substituted phenols: xylenol, butyl and amyl phenols with or without natural resin give products which are more soluble in the hydroxyl solvents used in the present invention, than the resins prepared with ordinary phenol.

(2) One or several drying oils, such as linseed oil, China-wood oil or mixtures thereof, which oils may undergo preliminary treatment by cooking or blowing. It might also be advantageous to add to the oils a small quantity of non-drying oil, such as castor oil, which makes it possible to obtain films of great plasticity.

(3) One or more solvents for the purpose of bringing the combination of phenolic resin and drying oil to the degree of viscosity required for use. These solvents are preferably single solvents or mixtures of solvents soluble in water and with free alcohol functions. This selection is made, not because of the use of water with the composition but because it has been discovered empirically that these substances are best adapted for use. The solvents are selected for compatibility with the oil and with the dispersion. Among these substances may be cited glycol and its acetates, glycol ethers and their acetates, lactates, in particular ethyl lactate, the monochlorhydrines of glycol, etc.

The preparation of the dispersions, according to the invention, is started by cooking the phenolic resin to a sufficiently high temperature in the presence of oils. The cooking process may take place between the temperatures of 150 to 300° centigrade, according to proportion and nature of the oil used. When combining the oil and the phenolic resin is finished, the temperature is allowed to drop and when it has dropped to below 100°, the proper solvents and diluents are added. If fast drying printing varnishes are wanted, a mixture of various dryers may be added containing fatty acid salts, for example, linoleate of cobalt, manganese, lead, calcium, etc. The thick solution obtained may be used immediately for printing by machine, block or "Lyonnaise."

The prints obtained are dried after application by the usual means at room temperature or higher. These prints are perfectly adherent and the printed fabric is ready for delivery without further fixation or washing operation being required.

The following example shows a composition which gives excellent results to carry out the printing according to the invention without limiting it in any way.

Start by preparing phenolic resin in the following manner, mix:

| | |
|---|---|
| Xylenol boiling between 205 and 215°___kg__ | 12 |
| Ester gum _____kg__ | 12 |
| Trioxymethylene _____kg__ | 4 |
| Caustic soda (sodium hydroxide) 10 N__cc__ | 150 |

Let boil for 15 minutes, at the end of which period add:

| | |
|---|---|
| Hydrochloric acid 5 N_____cc__ | 450 |

Let boil for one hour, after which wash with water until completely neutral. Then add to the resin 25 kg. of ester gum and cook for two hours between 210 and 220°. At the end of this period let cool; in this way phenolic resin is obtained which serves as a base for the preparation of a finish, according to the invention.

For the preparation of the dispersion, according to the invention, mix:

| | |
|---|---|
| Resin as above_____kg__ | 26 |
| China-wood oil_____kg__ | 14 |

Heat this mixture up to 270° and maintain the temperature at 270° for 10 minutes while inducing a jet (stream) of carbonic acid during the duration of the cooking period in order to avoid undue yellowing of the mixture. Then let cool again, and when the temperature has reached 90° add:

| | |
|---|---|
| Ethyl glycol acetate_____kg__ | 8 |
| Ethyl glycol_____kg__ | 6 |

After cooling is complete, the mixture obtained may be used for printing without any further additions. To this varnish may be added soluble coloring agents, or mineral or organic pigments.

The addition of colophony or of ester gum in two steps is for the following reason: if xylenol and formal alone are condensed at the outset with caustic soda a very violent reaction is obtained which is difficult to control. A certain amount of colophony is added at the outset to serve as a diluent and to moderate the reaction. Another reason is that the colophony or the ester gum added at the first stage of the reaction serves to regulate the pH of the condensation. Colophony and ester gum are actually weak acids of which the sodium salts play the part of buffers. The remainder of the colophony is only added during the cooking to obtain the necessary solubility in oil and to dilute the more expensive resin.

The factors on which the speed of drying is conditional are the following; their effects are additive and independent:

(a) The compositions dry quicker as they contain a greater amount of oil soluble phenol resin. For example a mixture containing one part of oil for two of resin dries much quicker than a mixture containing two of oil for one of resin, this is rather natural but consequently a mixture which is rich in resin is more brittle than a mixture which is rich in oil. For example a mixture containing one part of oil for two of resin can be dried in 15 minutes for a thickness of $\tfrac{1}{10}$ mm. without the addition of a dryer, whereas a mixture of two of oil for one of resin dries in 2½ hours even with a dryer. We are assuming in this case that drying is effected at ordinary temperature (20 to 25° C.), at 100° C. the drying is obviously quicker.

(b) The compositions dry quicker as they contain more dryer, up to a certain limit. These limits are known for each dryer: lead, calcium, cobalt, manganese, etc. Over a certain amount of dryer the speed of drying no longer increases and shagreened films are produced owing to the too rapid surface drying. The lower layers remain soft and movable under the impervious film.

(c) The compositions dry quicker as the oil and the resin are cooked at a higher temperature and for a longer time. The temperature is limited to 290 to 300° C. for China-wood oil, since above this temperature the oil gelifies and the whole mixture becomes insoluble. With linseed oil the temperature can be raised to 350 to 380° C. It should be noted that the higher the temperature used for cooking and the longer the time, the more the compositions become coloured even in the presence of a current of carbonic acid.

Furthermore by cooking at a high temperature for a long time the viscosity of the varnish increases, its mechanical properties improve but on the other hand more solvent is required to obtain the viscosity for use, which is an advantage or a drawback according to whether the solvents are cheaper or dearer than the resin composition.

The compositions dry quicker as the phenol varnish is prepared with a more substituted phenol. For example resins made with ordinary phenol dry less quickly than those which are prepared with xylenols. These latter resins dry less quickly than those which are prepared with amylphenol which themselves dry less quickly than those which are made with di-iso-butyl-phenol. More accurately, a resin dries quicker as the basic phenol is a phenol possessing more ramified substitutions: for example resins containing xylenol dry less quickly than those containing butylphenol.

Condensed phenol resins which are not too condensed are particularly suitable probably because they still contain sufficient free hydroxyls. There is a critical content of free hydroxyl to be observed: on the one hand if there is too much free hydroxyl (for example 10 to 15% soluble in soda) the resin is not soluble in oils unless such hydroxyl does not come from the resin but from an excess of free phenol, which is an indication of a defective manufacture. On the other hand, if there are too few free hydroxyls the resins are soluble in oils but they become more and more insoluble in the hydroxylated solvents and more and more soluble in hydrocarbons. It is known on the other hand that hydrocarbons are not suitable for the printing process owing to their great speed of evaporation and their surface tension. This is a corollary of what has been stated above; the more the resins are condensed the fewer free hydroxyls they contain since a plurality of chains are juxtaposed, free hydroxyls of two juxtaposed chains esterifying to give stable groups —O—.

It might be said, therefore, that phenol resins have stable properties as regards surface tension because they contain sufficient free hydroxyls.

Such free hydroxyls would in addition permit solution in hydroxylated solvents which are likewise indispensable.

Another advantage of the present invention consists in that the application of the above described dispersions on textile fabrics renders these impermeable to water while retaining the pliability. Printing by means of the finish described permits the most varied subsequent treatments of the printed fabrics (particularly resist work and over-dyeing except those carried out in very basic medium).

The various operations subsequent to the printing are as described in the co-pending application identified above. Briefly, such subsequent steps may consist in immunising, parchmentising, carbonising, etc. The only restriction on these after treatments is that the resin employed in the present composition is sensitive to strong alkali and those steps which require the use of the alkali would destroy the printed film.

The water soluble solvents set out above have rates of evaporation approximating that of water. The dryers and drying steps in conventional processes, which were, as above mentioned, designed for use with aqueous dispersions of mucilages etc., can be used without modification with a dispersion of phenolic resins which contain solvents approximating water in physical properties. By the present invention, therefore, resins of this type are prepared in a form modified for use in these processes and with these conventional machines.

What is claimed is:

A composition for use in a fabric printing process which comprises 26 parts of an ester gum modified xylenol-trioxymethylene resin, 14 parts China-wood oil, 8 parts ethyl glycol acetate, and 6 parts ethyl glycol.

MAURICE BELLOC.